(12) United States Patent
Lin

(10) Patent No.: US 11,388,007 B2
(45) Date of Patent: Jul. 12, 2022

(54) MOBILE DEVICE, VERIFICATION TERMINAL DEVICE AND IDENTITY VERIFICATION METHOD

(71) Applicant: Wistron Corp., New Taipei (TW)

(72) Inventor: Che-Lun Lin, New Taipei (TW)

(73) Assignee: WISTRON CORP., New Taipei (TW)

( * ) Notice: Subject to any disclaimer, the term of this patent is extended or adjusted under 35 U.S.C. 154(b) by 181 days.

(21) Appl. No.: 16/832,224

(22) Filed: Mar. 27, 2020

(65) Prior Publication Data

US 2021/0211289 A1 Jul. 8, 2021

(30) Foreign Application Priority Data

Jan. 7, 2020 (TW) ................................ 109100406

(51) Int. Cl.
*H04L 9/32* (2006.01)
*H04L 9/30* (2006.01)
*H04W 88/02* (2009.01)

(52) U.S. Cl.
CPC .......... *H04L 9/3231* (2013.01); *H04L 9/3213* (2013.01); *H04L 9/3247* (2013.01); *H04W 88/02* (2013.01)

(58) Field of Classification Search
CPC . H04L 9/3213; H04L 9/3231; H04L 63/0861; H04L 63/0807; H04L 9/3247; H04L 2209/80; H04W 88/02
See application file for complete search history.

(56) References Cited

U.S. PATENT DOCUMENTS

| | | | |
|---|---|---|---|
| 2013/0305059 A1* | 11/2013 | Gormley | H04L 9/0866 713/189 |
| 2014/0082718 A1* | 3/2014 | Yu | H04L 63/08 726/9 |
| 2015/0088755 A1* | 3/2015 | Sobel | G06Q 20/327 705/71 |
| 2016/0323273 A1* | 11/2016 | Aufderheide, Jr. | H04L 63/0861 |
| 2018/0084424 A1* | 3/2018 | Sonasath | H04W 12/068 |
| 2018/0253730 A1* | 9/2018 | Vohra | G06Q 20/20 |
| 2019/0325408 A1* | 10/2019 | Goroff | G06Q 20/3221 |

FOREIGN PATENT DOCUMENTS

| | | |
|---|---|---|
| CN | 102880960 A | 1/2013 |
| CN | 105046486 A | 11/2015 |
| CN | 106355004 A | 1/2017 |

* cited by examiner

*Primary Examiner* — Mohammad A Siddiqi
(74) *Attorney, Agent, or Firm* — McClure, Qualey & Rodack, LLP

(57) ABSTRACT

A mobile device includes a biological information detecting device and a wireless communication interface. The mobile device uploads the biological characteristic to the server. The server generates a token that corresponds to the biological characteristic and transmits the token to the mobile device. The mobile device transmits the token to the verification terminal device. The verification terminal device can confirm the identity of the user by verifying the token. This modularizes the process of identity verification, replacing the verification process of applications that need to verify identity, so that these applications do not need to bear the cost of identity verification after interfacing with the identity verification system.

18 Claims, 10 Drawing Sheets

MOBILE DEVICE, VERIFICATION TERMINAL DEVICE AND IDENTITY VERIFICATION METHOD

CROSS REFERENCE TO RELATED APPLICATIONS

This Applications claims priority of Taiwan Patent Application No. 109100406, filed on Jan. 7, 2020, the entirety of which is incorporated by reference herein.

BACKGROUND OF THE INVENTION

Field of the Invention

The invention is applied to identity verification, and in particular to identity verification using a mobile device, a verification terminal device, and an identity verification method.

Description of the Related Art

In recent years, biological recognition systems such as fingerprint recognition and facial recognition have been integrated into most mobile phones include. These biological recognition systems are quite popular and have a certain degree of accuracy. In addition, Near-field communication (NFC) is increasingly popular in mobile phones. Compare with Bluetooth technology, NFC having a long transmission rate (424 kbit/second) and transmission distance (less than 20 cm) that are not as good as Bluetooth technology. But, the fast connection, low power requirements, and low interference performance of NFC are better than Bluetooth. At the same time, NFC has higher security and confidentiality than Bluetooth. Therefore, NFC is often used in contactless tickets, and it is used to replace contactless tickets in mobile phone applications. The most common application is virtual credit card payment.

However, how to apply biological recognition and NFC on mobile devices to achieve identity verification, ensure the privacy of user data, and be compatible with a variety of application scenarios are still the problems that need to be improved in the field.

BRIEF SUMMARY OF THE INVENTION

In accordance with one feature of the present invention, the present disclosure provides a mobile device that includes a biological information detection device and a wireless communication interface. The biological information detection device is configured to capture a biological characteristic. The wireless communication interface is configured to receive a token corresponding to the biological characteristic and transmit the token to a verification terminal device. The token comprises access information, and the access information includes a public information status. In addition, an information category in the access information is related to the public information status.

In accordance with one feature of the present invention, the present disclosure provides a verification terminal device. The verification terminal device that includes a wireless communication interface and a processor. The wireless communication interface is configured to receive a token. The processor is configured to disassemble access information in the token. The access information includes a public information status. In addition, one information category in the access information is related to the public information status.

In accordance with one feature of the present invention, the present disclosure provides an identity verification method. The identity verification method includes following steps: capturing a biological characteristic; and transmitting the biological characteristic, and receiving a token corresponding to the biological characteristic. The token comprises access information, and the access information comprises a public information status. In addition, one information category in the access information is related to the public information status.

The mobile device, the verification terminal device, and the identity verification method shown in the embodiments of the present invention upload the biological characteristic to the server through the mobile device. The server generates a token corresponding to the biological characteristic. In addition, the server transmits the token to the mobile device. The mobile device transmits the token to the verification terminal device. The verification terminal device can verify the identity of the user by verifying the token, so that the process of identity verification is modularized, instead of the verification process of the application (interfacing system application) that originally needs to verify identity. By interfacing these applications with the identity verification system, there is no need for these applications to bear the cost of identity verification.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only example aspects of the disclosure and are not therefore to be considered to be limiting of its scope, the principles herein are described and explained with additional specificity and detail through the use of the accompanying drawings in which.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
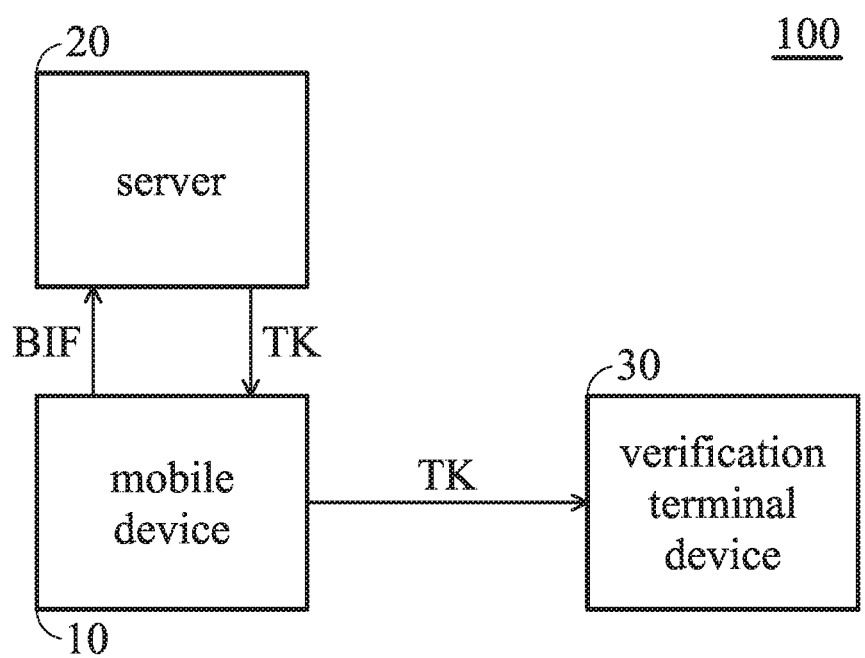
FIG. 1 is a block diagram of an identity verification system in accordance with one embodiment of the present disclosure.
Figure 2:
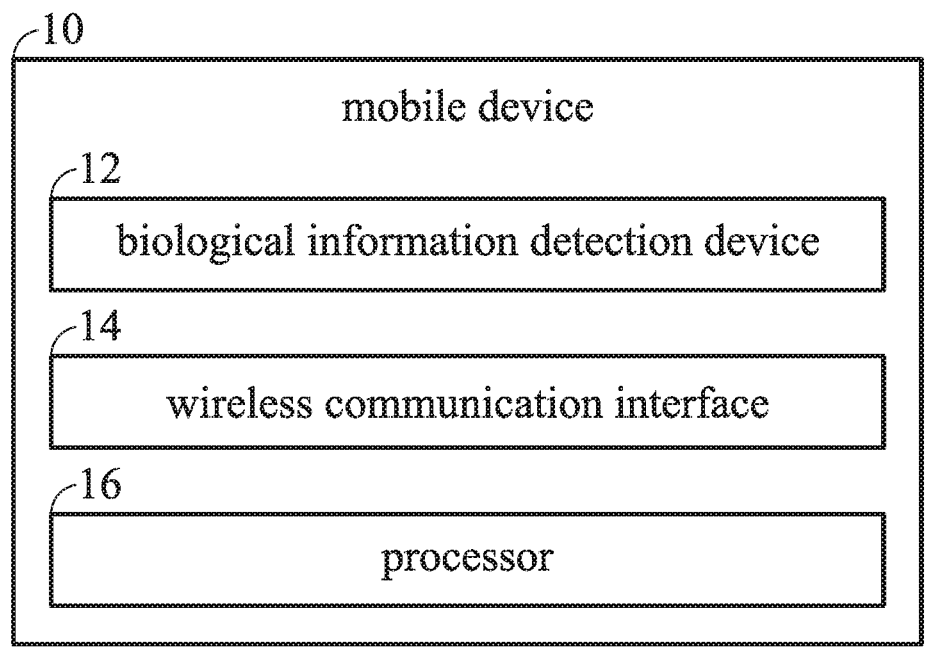
FIG. 2 is a block diagram of a mobile device in accordance with one embodiment of the present disclosure.
Figure 3:
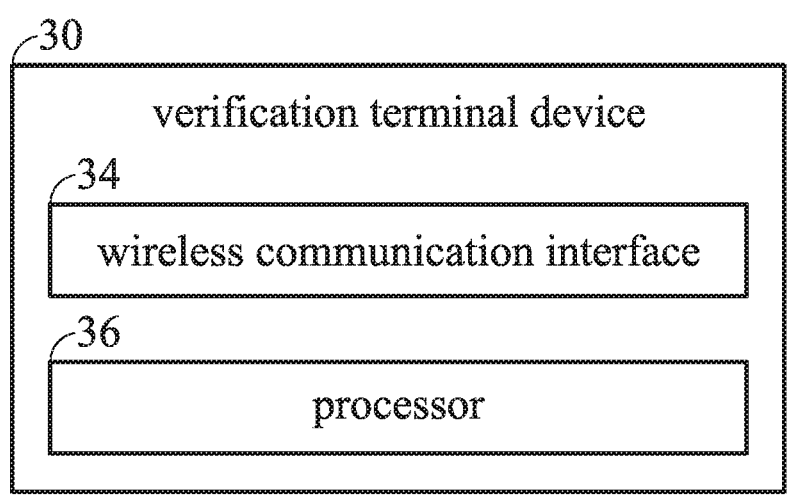
FIG. 3 is a block diagram of the verification terminal device in accordance with one embodiment of the present disclosure.

Please refer to FIGS. 1-3, FIG. 1 is a block diagram of an identity verification system 100 in accordance with one embodiment of the present disclosure. FIG. 2 is a block diagram of a mobile device 10 in accordance with one embodiment of the present disclosure. FIG. 3 is a block diagram of the verification terminal device 30 in accordance with one embodiment of the present disclosure.

In an embodiment, as shown in FIG. 1, the identity verification system 100 includes a mobile device 10, a server 20 and a verification terminal device 30.

In one embodiment, the mobile device 10 is, for example, a device such as a mobile phone, a tablet, a laptop, or the like. The server 20 and the verification terminal device 30 respectively can be, for example, desktop computers, laptops, or other electronic devices with computing capabilities. In one embodiment, the verification terminal device 30 can also be a Point of Sales (POS) device, an in-vehicle electronic device, an access control device, an airline customer identity verification device, a hospital patient identity verification device, or other wireless communication devices.

In one embodiment, as shown in FIG. 2, the mobile device 10 includes a biological information detection device 12 and a wireless communication interface 14. In one embodiment, the mobile device 10 further includes a processor 16. The processor 16 is configured to execute an application. For example, the processor 16 is configured to execute a biological characteristic recognition application on the mobile device 10.

In one embodiment, the biological information detection device 12 includes a facial recognition system, a voiceprint recognition system, an iris recognition system, a vein recognition system, a handwriting recognition system and/or a fingerprint recognition system.

In one embodiment, a facial recognition system includes a processor and a camera. In one embodiment, the camera is composed of at least one Charge Coupled Device (CCD) or a Complementary Metal-Oxide Semiconductor (CMOS) sensor. The camera sends the captured face image to the processor 16. The processor 16 applies a known facial recognition algorithm to identify the biological characteristic BIF.

In one embodiment, the fingerprint recognition system is a set of pattern recognition systems including modules for fingerprint image acquisition, processing, feature extraction and comparison. The fingerprint recognition system can obtain fingerprint images from optical emission devices, capacitive sensors, radio-frequency sensors, digital cameras and other devices, and then transfer the fingerprint images to the processor 16. The processor 16 applies a fingerprint identification algorithm to identify the biological characteristic BIF.

In one embodiment, the voiceprint recognition system is based on the individual characteristics of each person's voice, and uses the individual voice characteristics as the basis for identifying the biological characteristic BIF.

In one embodiment, a vein recognition system uses the palm vein distribution in the human body as a sample, and the palm vein distribution of an individual is used as a basis for identifying the biological characteristic BIF.

In one embodiment, because the iris is a colored part of the human eyeball and each person's iris is different, an iris recognition system can use individual iris characteristics as a basis for identifying the biological characteristic BIF.

In one embodiment, a handwriting recognition system uses personal handwriting as a reference, and uses personal handwriting characteristics as a basis for identifying the biological characteristic BIF.

The biological characteristic BIF described in the embodiment of the present invention is not only facial recognition and/or fingerprint recognition, any biological information sufficient to verify the identity of the user can be used.

In one embodiment, the wireless communication interface 14 can be implemented by Near-field communication (NFC), Wi-Fi, Bluetooth, Zigbee, or another wireless communication device.

In one embodiment, the processor 16 can be implemented by an integrated circuit such as a micro controller, a microprocessor, a digital signal processor, an application specific integrated circuit (ASIC), or a logic circuit.

In one embodiment, as shown in FIG. 3, the verification terminal device 30 includes a wireless communication interface 34 and a processor 36.

In one embodiment, the wireless communication interface 34 can be implemented by NFC, Wi-Fi, Bluetooth, Zigbee, or other wireless communication devices.

In one embodiment, the processor 36 can be implemented by an integrated circuit such as a micro controller, a microprocessor, a digital signal processor, an application specific integrated circuit (ASIC), or a logic circuit.

Figure 4:
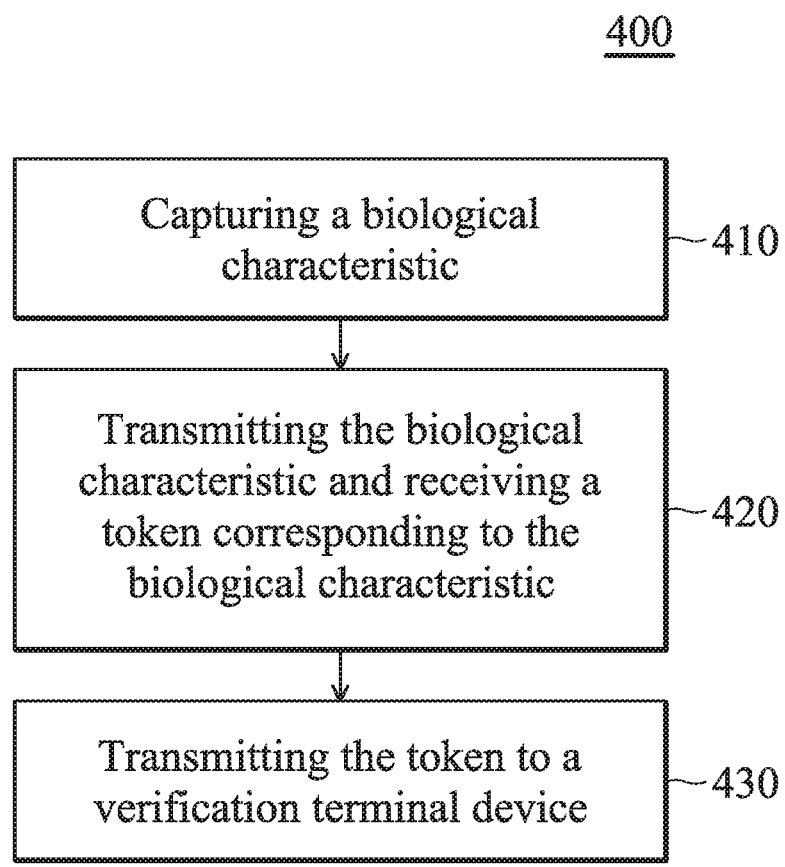
FIG. 4 is a flowchart of an identity verification method in accordance with one embodiment of the present disclosure.

Please refer to FIG. 4, FIG. 4 is a flowchart of an identity verification method 400 in accordance with one embodiment of the present disclosure.

In step 410, a biological characteristic BIF is captured by using the biological information detection device 12 of the mobile device 10.

In one embodiment, the biological information detection device 12 uses a facial recognition system and/or a fingerprint recognition system to capture the user's biological characteristic BIF.

In step 420, the wireless communication interface 14 of the mobile device 10 transmits the biological characteristic BIF and receives a token TK corresponding to the biological characteristic BIF.

In one embodiment, the wireless communication interface 14 receives a token TK generated according to the biological characteristic BIF from a server 20. More specifically, the information in the token TK can be stored in the server 20 firstly. After receiving the biological characteristic BIF, the server 20 finds out the information corresponding to the biological characteristic BIF to generate a token TK. The server 20 then transmits the token TK to the wireless communication interface 14 in the mobile device 10.

In one embodiment, information related to the user does not need to be bound to the mobile device 10. In addition, the mobile device 10 only plays a role of obtaining a biological characteristic BIF. In other words, the mobile device 10 can be a public mobile device (e.g., a mobile phone or tablet set for the hotel lobby for users to log in to the personal reservation page).

Please refer to FIGS. 5A-5D, FIGS. 5A-5D are schematic diagrams of the internal information of the token TK in accordance with one embodiment of the present disclosure.

In one embodiment, the token TK includes an effective time ET, a digital signature DS, and access information SD. In addition, the access information SD includes a public information status 51.

Figure 5A:
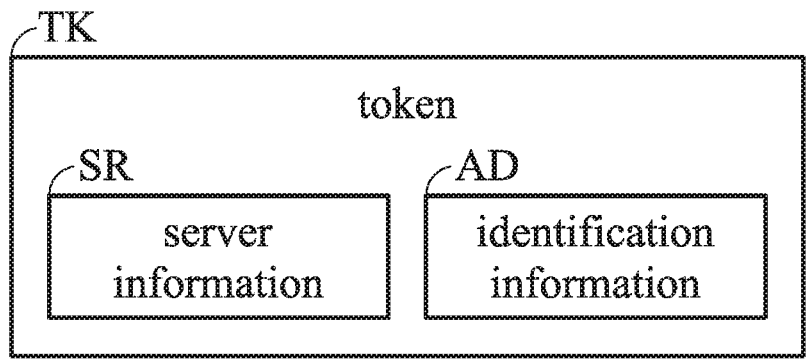
FIGS. 5A-5D are schematic diagrams of the internal information of the token in accordance with one embodiment of the present disclosure.

As shown in FIG. 5A, the token TK includes server information SR and identification information AD.

Figure 5B:
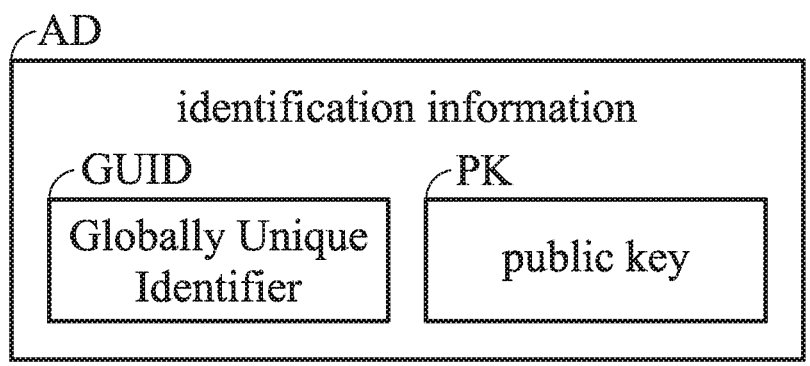

As shown in FIG. 5B, the identification information AD includes a Globally Unique Identifier (GUID) and a public key PK. In one embodiment, the public key PK can be used to encrypt information in the token TK in whole or in part.

Figure 5C:
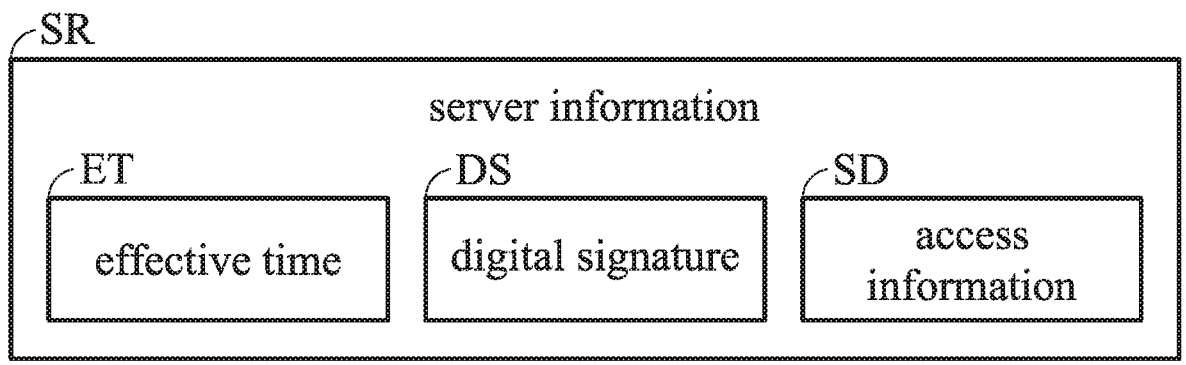

As shown in FIG. 5C, the server information SR includes an effective time ET, a digital signature DS, and access information SD.

Figure 5D:
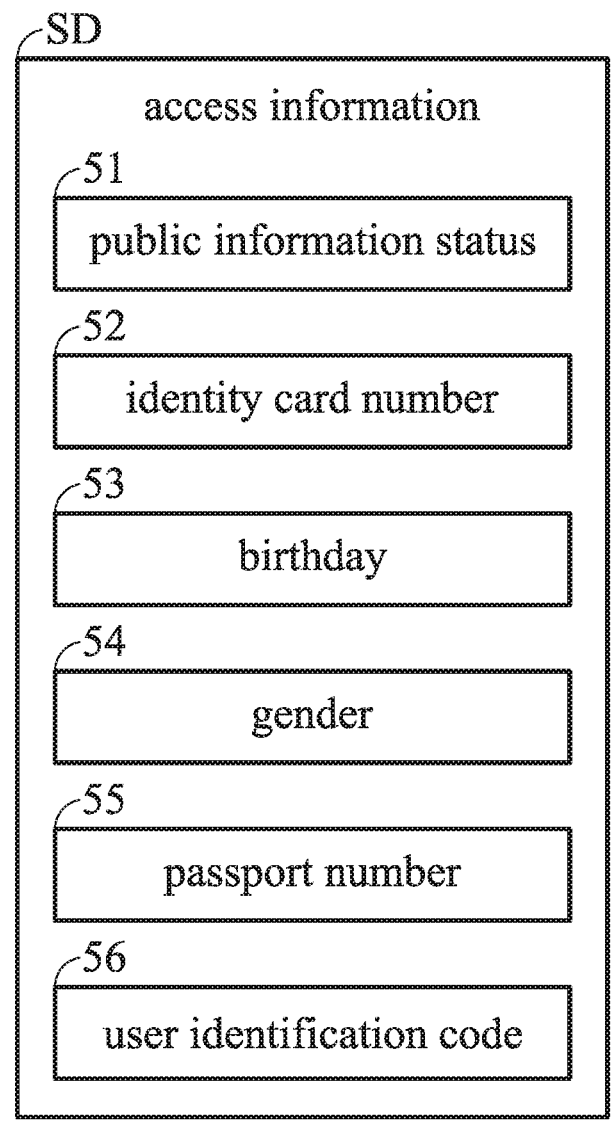
Figure 10:
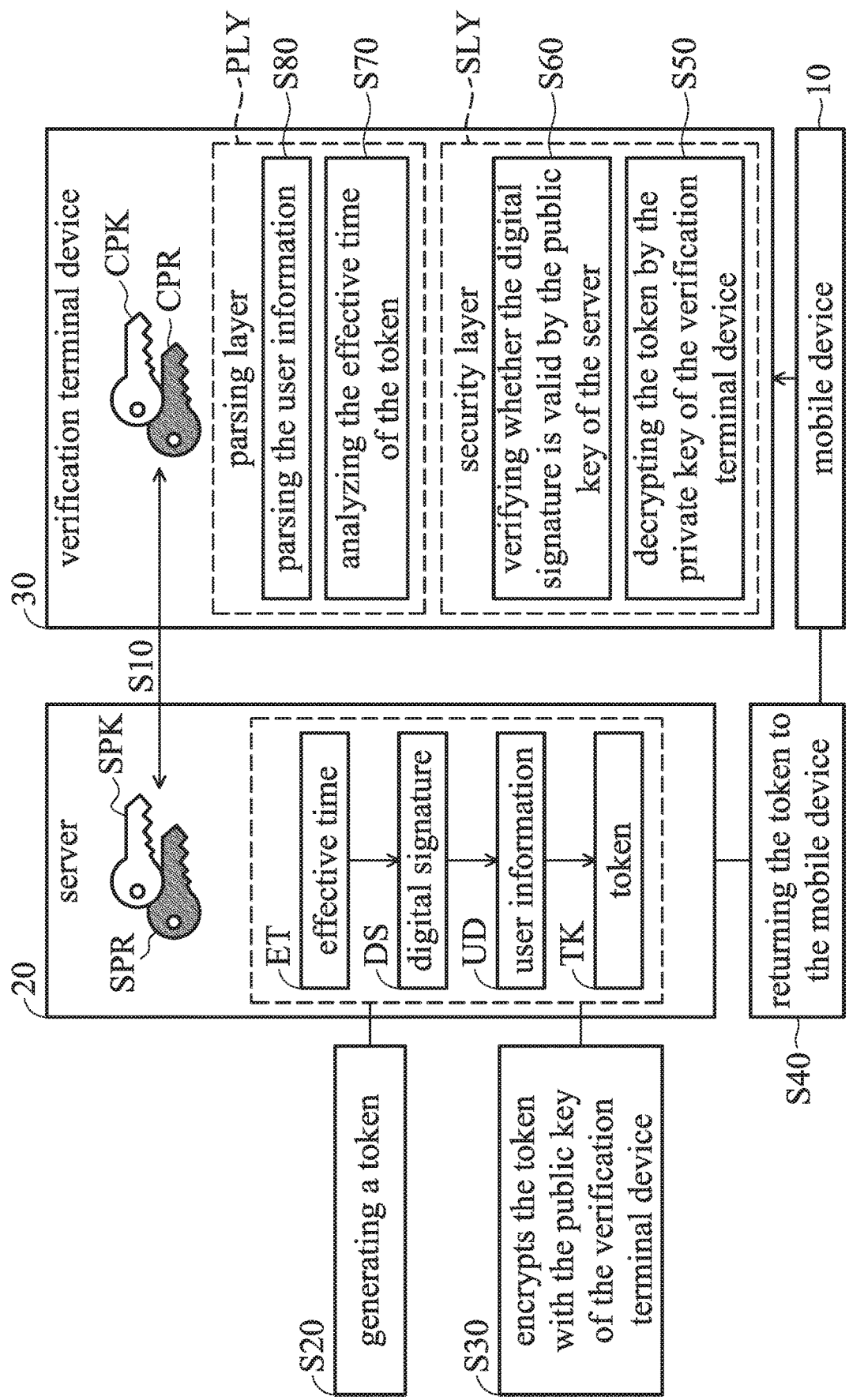
FIG. 10 is a schematic diagram of a verification terminal device analyzing a token in accordance with one embodiment of the present disclosure.

As shown in FIG. 5D, in one embodiment, the access information SD includes the public information status 51, the identity card number 52, the birthday 53, the gender 54, passport number 55, and/or the user identification code 56, and these information are regarded as the user information UD (as shown in FIG. 10). The user identification code 56 can refer to an ID card number or other specific code corresponding to the user USR. In one embodiment, the categories of information in the access information SD are related to the public information status, some categories of information are suitable for public, and some categories of information are not suitable for public. Please refer to the next step 720 for details. By modifying the public information status 51, the access right of each data to be accessed by other devices can be set. The content of the access information SD here is only an example. The category of information can be called as information category. It is not limited thereto.

In step 430, the token TK is transmitted to a verification terminal device 30 via the wireless communication interface 14 of the mobile device 10.

Figure 6:
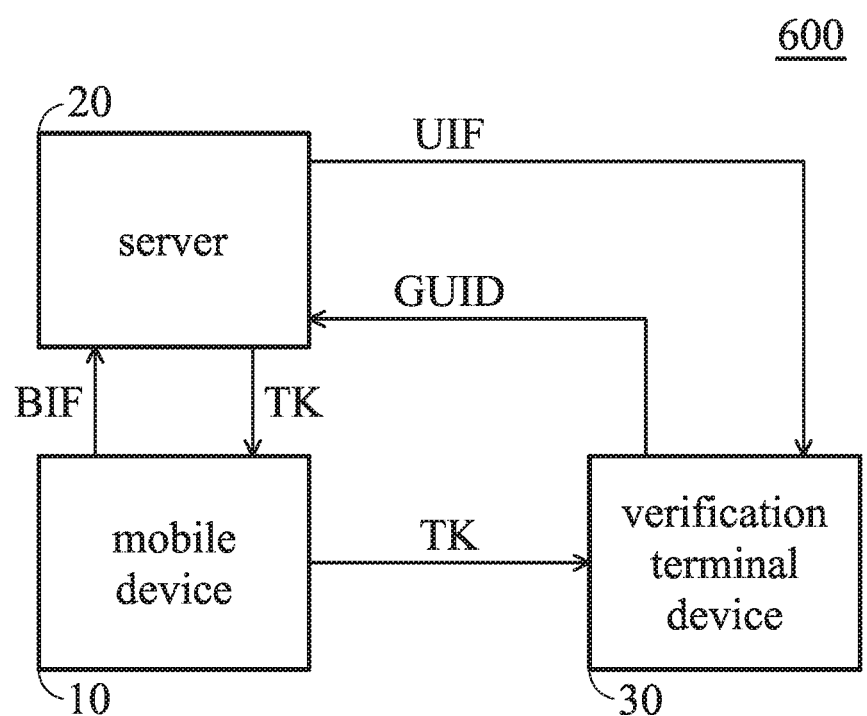
FIG. 6 is a block diagram of an identity verification system in accordance with one embodiment of the present disclosure.
Figure 7:
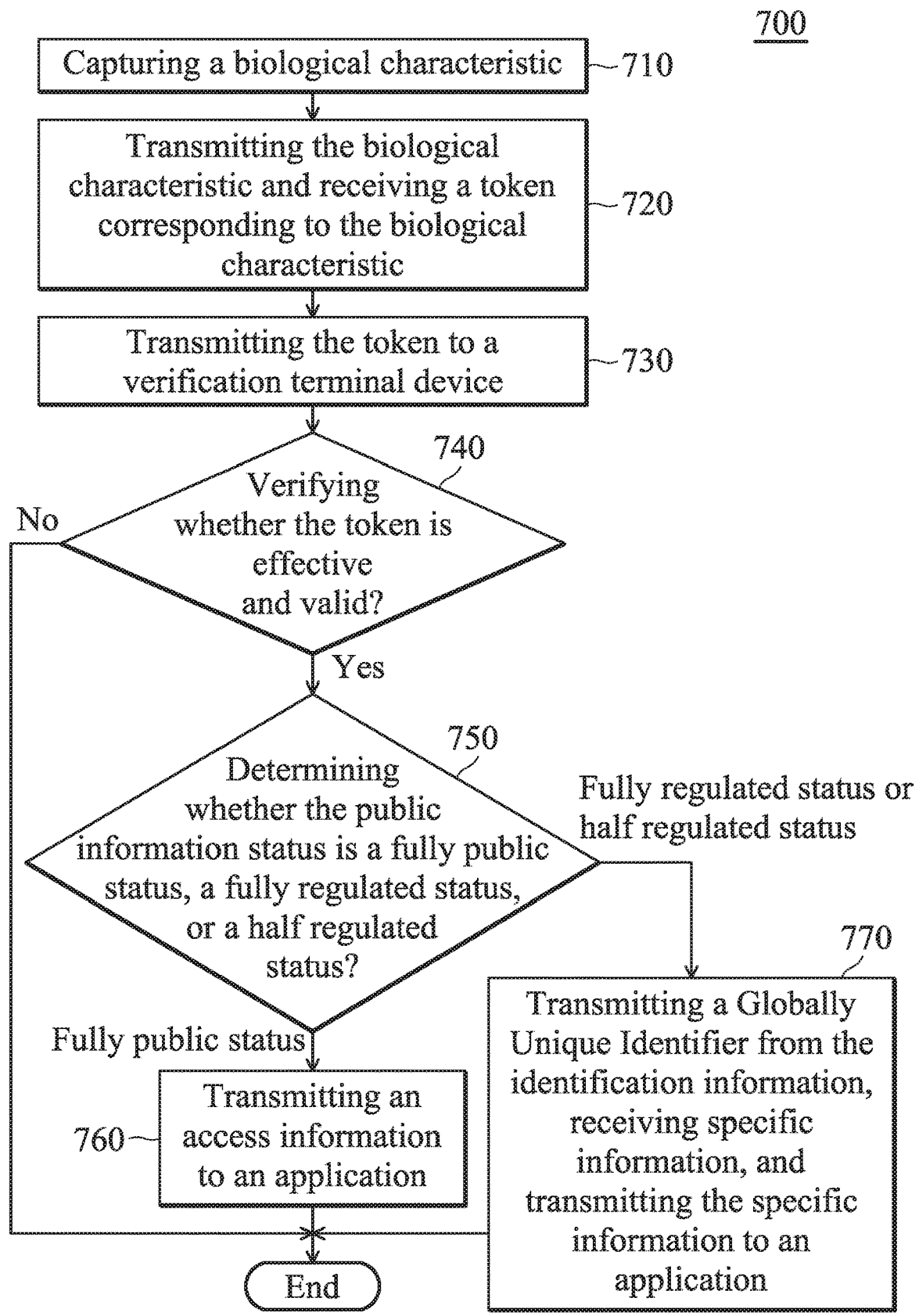
FIG. 7 is a flowchart of an identity verification method in accordance with one embodiment of the present disclosure.

Please refer to FIGS. 6 to 7, FIG. 6 is a block diagram of an identity verification system 600 in accordance with one embodiment of the present disclosure. FIG. 7 is a flowchart of an identity verification method 700 in accordance with one embodiment of the present disclosure. The difference between FIG. 6 and FIG. 1 is that the verification terminal device 30 in FIG. 6 transmits the Globally Unique Identifier (GUID) in the identification information AD to the server 20 to ask the server 20 for the information which is required by the verification terminal device 30 (for example, the user's passport number 55). The server 20 returns the specific information UIF to the verification terminal device 30. The detailed description will be given below by the steps in FIG. 7. Since steps 710 to 730 in FIG. 7 are respectively the same as steps 410 to 430 in FIG. 4, these steps are not repeated here.

In step 740, the verification terminal device 30 verifies whether the token TK is effective and valid. If the verification terminal device 30 verifies that the token TK is effective and valid, step 750 is performed. If the verification terminal device 30 verifies that the token TK is not effective and invalid, the process is ended, or an error message is returned to the mobile device 10. More specifically, the verification terminal device 30 can determine whether the token TK is effective and valid by verifying the digital signature DS and the effective time ET. In one embodiment, the processor 36 is further configured to verify the digital signature DS. In response to the processor 36 determining that the token TK is valid according to the effective time ET or the digital signature DS, the processor 36 determines whether the public information status 51 in the token TK is a fully public status, a fully regulated status, or a half regulated status.

In one embodiment, the verification terminal device 30 can apply a known digital signature verification algorithm to verify the digital signature DS of the token TK. In one embodiment, when the verification terminal device 30 obtains the encrypted token TK, the verification terminal device 30 can apply a known decryption algorithm (for example, by using a private key) to decrypt the token TK. In another embodiment, the verification terminal device 30 can further determine whether the token TK has not exceeded the effective time ET in step 740.

In step 750, the verification terminal device 30 determines whether the public information status 51 is a fully public status, a fully regulated status, or a half regulated status. If the verification terminal device 30 determines that the public information status 51 is a full public state, step 760 is performed. If the verification terminal device 30 determines that the public information status 51 is a fully regulated status or a half regulated status, step 770 is performed.

In one embodiment, in step 720, after receiving the biological characteristic BIF, the server 20 finds out the information corresponding to the biological characteristic BIF. In the process of generating the token TK, the server 20 can set the public information status 51 according to the preset public information status 51 or the configuration by user through the mobile device 10, the public information status 51 determines whether the contents of the access information SD (that is, the information type) are hidden or whether each content of the access information SD exists in the token TK. Therefore, in one embodiment, the access information SD can determine whether to include the user identification code 56 and the user basic information (e.g., birthday 53 and gender 54) into the token TK according to the public information status 51.

When the public information status 51 is a full public status, the server 20 brings both the user identification code 56 and the user basic information to the token TK. In other words, when the public information status 51 is a full public status, the token TK includes a user identification code 56 and basic user information. In one embodiment, when the public information status 51 is a full public status, the token TK includes all categories of information of user basic information. In one embodiment, when the public information status 51 is a full public status, the basic user information in the token TK includes multiple categories of information.

In one embodiment, the data required by the verification terminal device 30 can be directly accessed from the data in the token TK, and the data does not need to be obtained through the server 20. In an embodiment, the basic user information is, for example, birthday 53 and gender 54. When the public information status 51 is a full public status, the server 20 will enclose both the user identification code 56 and the user basic information (e.g., birthday 53 and gender 54) to the token TK according to the public information status 51. For example, since the public information status 51 is a full public status, when the verification terminal device 30 needs the information of gender 54, it can be obtained directly from the data in the token TK.

When the public information status 51 is a half regulated status, for example, the server 20 only carries the user identification code 56 to the token TK. In one embodiment, when the public information status 51 is a half regulated status, the token TK includes a user identification code 56, but there is no basic user information. Here is an example; the information carried in the token TK is not limited to the user identification code 56. In another embodiment, the user can also freely set which data can be carried in the token TK in the half regulated status. In one embodiment, when the public information status 51 is a half regulated status, the token TK carries basic user information including at least one category of information. In one embodiment, when the public information status 51 is a half regulated status, the basic user information in the token TK includes at least one categories of information.

For example, the server 20 sets specific information (e.g., passport number 55) as protected half regulated data in advance. In the half regulated status, there is no passport number 55 in the token TK and only a user identification code 56 in the token TK. The passport number 55 is stored in the server 20 and can be accessed by the airline's verification terminal device 30 after confirming the Globally Unique Identifier (GUID). When the airline's verification terminal device 30 requires a passport number 55, it sends a Globally Unique Identifier (GUID) to the server 20, and requests to obtain a passport number 55. After the server 20 checks the Globally Unique Identifier (GUID) and confirms that it is correct, the server 20 transmits the passport number 55 corresponding to the Globally Unique Identifier (GUID) to the airline's verification terminal device 30.

In one embodiment, under the condition that the public information status 51 is a half regulated status and the server 20 only carries the user identification code 56 to the token TK, when the verification terminal device 30 only needs the user identification code 56, it is not necessary to send the Globally Unique Identifier (GUID) to the server 30. The verification terminal device 30 can directly access the data of the user identification code 56 from the token TK.

When the public information status 51 is a fully regulated status, the server 20 does not enclose the user identification code 56 or the user basic information to the token TK. In other words, the user identification code 56 and the user basic information do not exist in the token TK. In one embodiment, when the public information status 51 is a fully regulated status, any kind of category of information of the user basic information is not included in the token. For example, the server 20 sets certain information (e.g., passport number 55) in advance as fully hidden regulated data. The hospital's verification terminal device 30 cannot access the passport number 55 from the token TK. When the hospital's verification terminal device 30 needs a passport number 55, it sends the Globally Unique Identifier (GUID) to the server 20, and the hospital's verification terminal device 30 requests the server 20 to obtain a passport number 55. The server 20 will not transmit the passport number 55 corresponding to the Globally Unique Identifier (GUID) to the verification terminal device 30 of the hospital. In one embodiment, when the public information status 51 is a fully regulated status, the token TK does not include any kind of category of information of the user basic information.

On the other hand, when the server 20 sets specific information (e.g., birthday 53 and gender 54) in advance as fully regulated data, when the hospital's verification terminal device 30 needs birthday 53 and gender 54, it sends the Globally Unique Identifier (GUID) to the server 20 to ask for birthday 53 and gender 54. The server 20 transmits the birthday 53 and gender 54 corresponding to the Globally Unique Identifier (GUID) to the verification terminal device 30 of the hospital.

In one embodiment, the user information UD carried by the token TK can be adjusted according to the user's settings. Even in fully public status, only the basic information (e.g., birthday 53 and gender 54) of the user information UD is carried by the token TK. For more private user information, the required information needs to be obtained by the verification terminal device 30. The verification terminal device 30 transmits the Globally Unique Identifier (GUID) to the server 20 for obtaining the required information involving more privacy. In the half regulated status, except for the user identification code 56 which can be obtained directly from the token TK in the half regulated status, all information needs to be obtained from the server 20 according to the Globally Unique Identifier (GUID). If it is in a fully regulated status, all information needs to be obtained from the server 20 according to the Globally Unique Identifier (GUID). In this way, the information of the user USR is protected from disclosure under unnecessary circumstances.

In step 760, the verification terminal device 30 transmits an access information SD to an application.

When the public information status 51 is a full public status, the server 20 encloses both the user identification code 56 and the user basic information to the token TK. Therefore, the verification terminal device 30 can directly transmit the information in the access information SD to the application. The application described here can be a third-party system or an application that interfaces with the system.

In step 770, the verification terminal device 30 transmits a Globally Unique Identifier (GUID) from the identification information AD, receives specific information, and transmits the specific information to an application.

In one embodiment, in response to the verification terminal device 30 determining that there is no specific information requested by the verification terminal device 30 in the access information SD in the token TK, the verification terminal device 30 transmits a Globally Unique Identifier (GUID) in the identification information AD in the token TK or transmits identification information AD in the token TK to the server 20. The verification terminal device 30 receives specific information from the server 20, and the verification terminal device 30 transmits the specific information to an application.

In an embodiment, the application is, for example, a hotel system, a vehicle system, a hospital system, etc. Each application requires different user information. Through the identity verification method 700, the function of identity verification can be integrated with applications according to different requirements.

Figure 8:
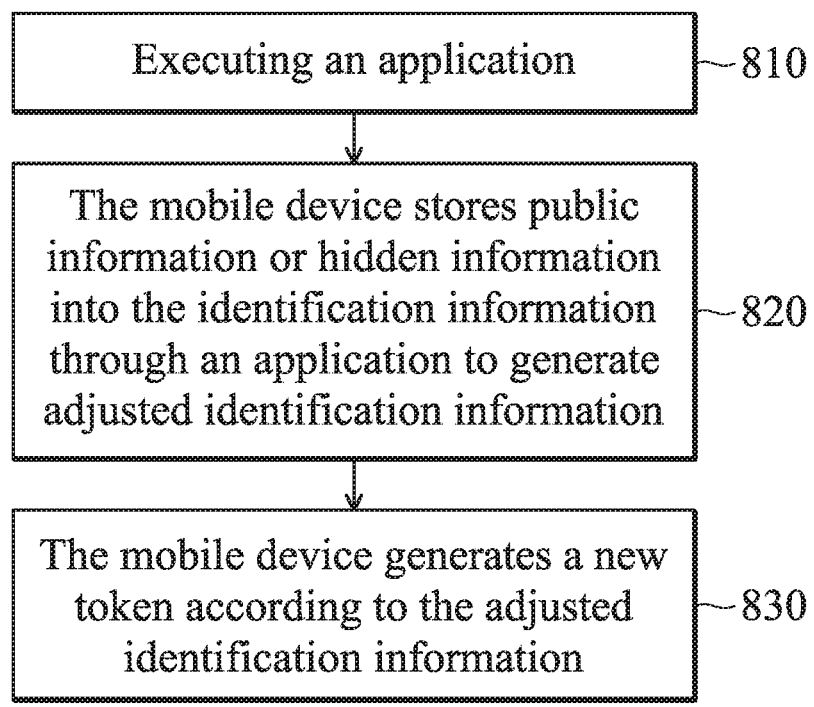
FIG. 8 is a flowchart of a method for updating a token in accordance with one embodiment of the present disclosure.

Please refer to FIG. 8, FIG. 8 is a flowchart of a method 800 for updating a token TK in accordance with one embodiment of the present disclosure.

In step 810, the processor 16 of the mobile device 10 executes an application. In one embodiment, the application is, for example, a biometric identification application executing by the mobile device 10.

In step 820, the mobile device 10 stores public information or hidden information into the identification information AD through an application to generate adjusted identification information.

In one embodiment, the mobile device 10 takes out the public key PK in the identification information AD, writes the public information or hidden information into the identification information AD, and then encrypts the identification information AD with the public key PK. In this process, the server information SR and the data in the server 20 are not changed. For example, when the user sets the passport number 55 as hidden information, the mobile device 10 takes out the public key PK in the identification information AD, writes the identification information AD into the hidden information (for example, setting the passport number 55 as mandatory hidden information) and then uses the public key PK to encrypt the identification information AD.

The application used in this step is, for example, a biometric application executing on the mobile device 10. In another embodiment, the biometric application provides a user interface. This user interface allows the user to set basic user information (e.g., various contents in the access information SD) of various categories of information associated with the user as public information or hidden information.

In step 830, the mobile device 10 generates a new token according to the adjusted identification information.

In one embodiment, the new token is generated by the mobile device 10 and not generated by the server 30. In one embodiment, the processor 16 in the mobile device 10 is used to execute an application. For example, the processor 16 is configured to execute a biometric application on the mobile device 10. In one embodiment, the application is used to adjust the public information or the hidden information of the identification information AD to generate the adjusted identification information, and generate a new token according to the adjusted identification information. For example, the processor 16 in the mobile device 10 executes an application to write information (for example, blood type, weight, and address) that the user USR wants to conceal into the identification information AD to generate the adjusted identification information. In addition, the processor 16 according to the adjusted identification information to generate a new token.

In one embodiment, the processor 16 in the mobile device 10 is used to execute an application. The application adjusts public information or hidden information in the access information or adjusts public information or hidden information in the identification information AD in the token TK, the public information in the access information SD or the hidden information in the access information SD to generate the adjusted identification information or the adjusted access information. The application generates a new token according to the adjusted identification information or adjusted access information.

After the user USR uploads his/her biological characteristic (for example, fingerprints) to the server 20 through the mobile device 10 (for example, through the biometric identification application in the mobile device 10), the server 20 compresses the effective time ET, the digital signature DS, and the access information SD corresponding to the biological characteristic into the server information SR. The server 20 encrypts the server information SR with the public key CPK of the verification terminal device 30. The server 20 generates the identification information AD and another public key PK, and stores the other public key PK into the identification information AD. Next, the server 20 compresses the encrypted server information SR and the identification information AD into a token TK. In one embodiment, the server 20 can sign the token TK by using its own private key SPR. Next, the server 20 transmits the token TK to the mobile device 10.

In one embodiment, the user USR can input instructions to the processor 16. For example, when the user USR wants to adjust mandatory hidden information (e.g., address) to public information and/or wants to adjust public information (e.g., birthday) to hidden information, the user USR can use the user interface of the applications executed by the mobile device 10 to adjust mandatory hidden information (e.g., address) to public information and/or adjust public information (e.g., birthday) to hidden information. In other words, the processor 16 executes an application. The application adjusts the public information (e.g., adjusting the address to public information) and/or hidden information (e.g., adjusting the birthday to hidden information) in the access information to generate an adjusted access information. The mobile device 10 generates a new token based on the adjusted access information.

In one embodiment, the user USR can input instructions to the processor 16. For example, the user USR can add, modify or delete the content of the identification information AD through the user interface of application executed by the mobile device 10 (for example, he can write the address information that the user USR wants to forcibly hide into the identification information AD) and write public information and/or hidden information into the identification information AD to generate the adjusted identification information. The mobile device 10 generates a new token according to the adjusted identification information. In one embodiment, the mobile device 10 encrypts the adjusted identification information after taking out the public key PK, so as to form a new token.

In one embodiment, if the identification information AD or the access information SD is adjusted and the mobile device 10 generates a new token according to the adjusted information, the token TK described in the subsequent steps is replaced by the new token. The difference between the token TK and the new token is that the new token is generated based on the adjusted information of the token TK. For the convenience, the token TK will still be used for explanation.

After receiving the token TK, the verification terminal device 30 firstly decrypts the server information SR by the private key CPR of the verification terminal device 30. Next, the verification terminal device 30 verifies whether the digital signature is valid by the public key SPK of the server 20. If it is valid, the verification terminal device 30 analyzes the effective time ET in the server information SR. Then, the verification terminal device 30 analyzes the access information SD to obtain the required information content. If the verification terminal device 30 needs other information of the user USR (e.g., a ticket code or other information that does not exist in the token TK), it will send the entire encrypted adjusted identification information to the server 20 to obtain the additional required information.

After the server 20 receives the encrypted adjusted identification information, the server 20 will decrypt the encrypted adjusted identification information by the private key of the server 20, and then obtain other information of the user USR according to the Globally Unique Identifier (GUID). Finally, the other information is compared with the mandatory hidden information of the user USR in the adjusted identification information (i.e., the public information or hidden information in the adjusted identification information). For example, the comparison result is that the ticket code is not mandatory hidden information. Then, the server 20 returns other information of the user USR (for example, a ticket code) that can be published and is required by the verification terminal device 30 to the verification terminal device 30.

Thereby, various information of the user USR can be set to be forced hidden from being transmitted to prevent that the server 20 transmits the sensitive data of the user USR to the verification terminal device 30. Therefore, the effect of improving the data security of the user USR can be achieved.

In addition, the user USR can adjust the public information or the hidden information through an application (for example, a biometric application) executed by the mobile device 10 to control the authority of each data in the server 20 or the token TK to be accessed by external device.

It can be known from the foregoing that through the identity verification methods 400, 700, and 800, the authority of natural person data to be accessed by external devices can be effectively controlled, and the correctness of the token TK can be verified. In addition, the verification terminal device 30 can transmit part or all of the access information SD to an application in a third-party system for further applications.

Figure 9:
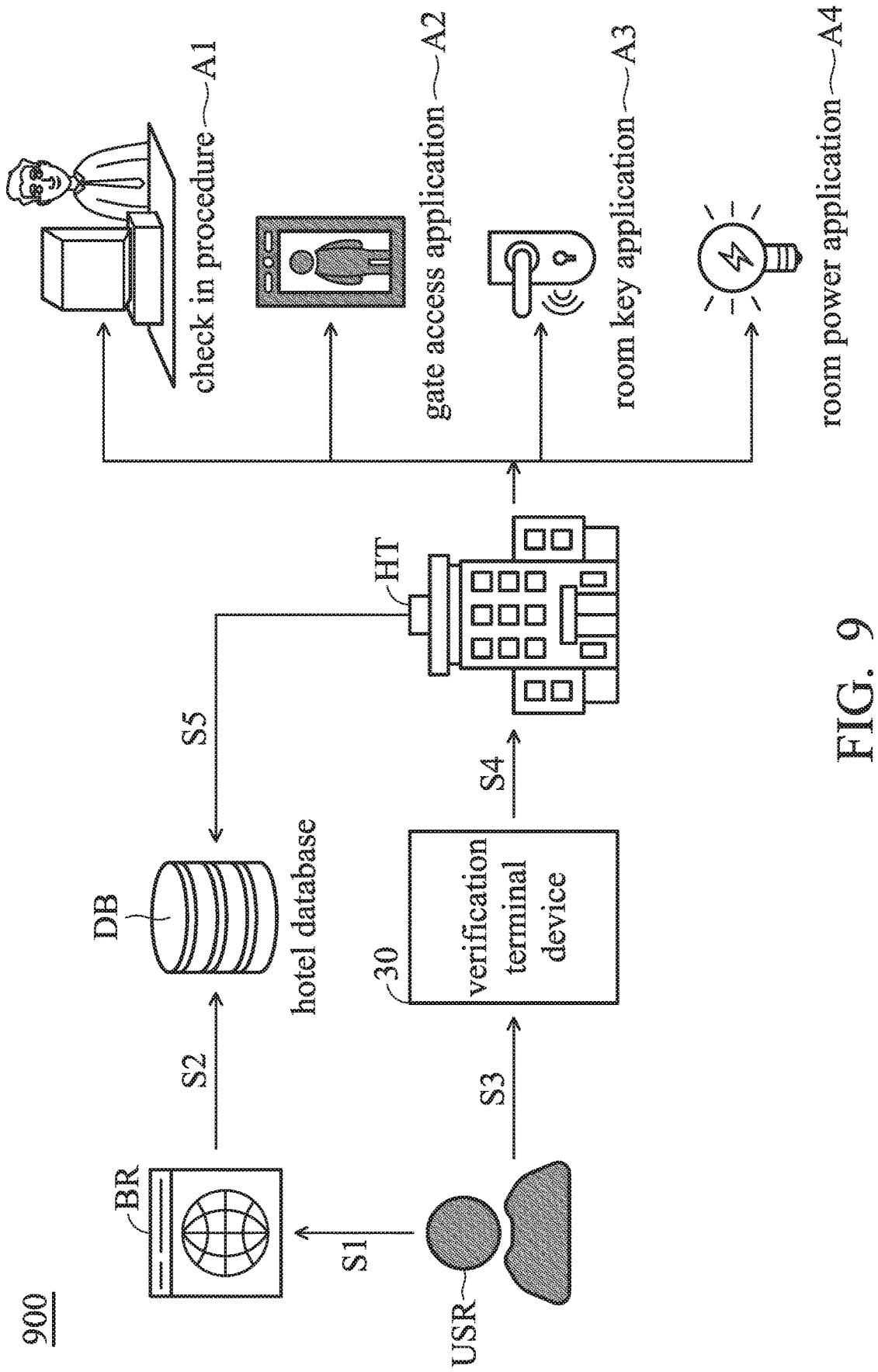
FIG. 9 is a schematic diagram of a hotel system in accordance with one embodiment of the present disclosure.

Please refer to FIG. 9, FIG. 9 is a schematic diagram of a hotel system 900 in accordance with one embodiment of the present disclosure. The hotel system 900 interfaces with the verification terminal device 30.

In one embodiment, in step S1, the user USR firstly makes a reservation to the hotel HT integrated with the verification terminal device 30 through the website BR (the hotel HT can use its own server for data management). In step S2, the hotel system 900 writes the reservation record of the user USR and the information of the user USR into the hotel database DB (for example, the user's name and passport number 55, etc.). In step S3, when the user USR arrives at the hotel HT, the hotel HT can verify the identity through the verification terminal device 30 to obtain the information of the user USR. In step S4, the verification terminal device 30 transmits the information to the hotel system 900 to confirm the reservation. In step S5, the server of the hotel HT compares the information with the data stored the hotel database DB. If the information matches the data stored the hotel database DB, the check in procedure A1 is completed.

In one embodiment, the server of the hotel HT can integrate the gate access control system with the verification terminal device 30 to apply to the gate access application A2. For example, the access control system of the hotel HT obtains the identity of the user USR and confirms it after obtaining the token TK through the verification terminal device 30. Once it is confirmed that the user USR is the current tenant of the hotel HT, the verification terminal device 30 controls the access control system to automatically open the door.

In one embodiment, the verification terminal device 30 can be integrated with the room access control system (for room key application A3) and the power system (for room power application A4). After obtaining the token TK through the verification terminal device 30 outside the door and obtaining the identity of the user USR through the token TK, the hotel system 900 compares whether the user USR is a tenant of the room. If it is correct, the verification terminal device 30 controls the access control system of the room, so that the user USR can enter the room and control the power system of the room instead of using the hotel room card or the hotel key.

In one embodiment, the scenario of FIG. 9 can be applied to an unmanned hotel HT. The hotel system 900 and the verification terminal device 30 achieve a fully self-service hotel management.

In one embodiment, the verification terminal device 30 can provide an identity verification function and interface with other systems (i.e., an interface system, such as a hotel system 900). Since the verification terminal device 30 is a role that assists the user's identity verification to interface with other systems, the verification terminal device 30 does not have more detailed information than the user information UD (e.g., user identification code 56, gender 54, name, family register, parents, etc.). For example, the ticket information or medical records required by other systems do not exist in the verification terminal device 30. The information required by other systems should be held by other systems interacting with the verification terminal device 30. After other systems obtain the required user information UD through the verification terminal device 30, other systems will perform other processes in their own systems (such as reading other detailed information).

Taking the hospital system as an example, the hospital system informs the verification terminal device 30 that it needs to obtain the user identification code 56 by installed program of the verification terminal device 30. After obtaining the user identification code 56, the hospital system further obtains the medical record data of the user USR corresponding to the user identification code 56 according to the user identification code 56. The above is the process to be executed after the hospital system obtains the user identification code 56 through the verification terminal device 30. However, in this case, the verification terminal device 30 does not need to know or care about this process. The verification terminal device 30 only needs to verify the identity of the user USR (identity verification) and to know that the hospital system (interfacing system) needs the verification terminal device 30 to send the user identification code 56 to the hospital system, so that the hospital system (interfacing system) can do its own internal process. Therefore, the verification terminal device 30 is used to verify the identity of the user, and the interfacing system informs the required user information UD by installed program of the verification terminal device 30. The verification terminal device 30 cannot need to process subsequent processes or control more detailed data.

In one embodiment, the verification terminal device 30 can provide the functions of identity verification and system interface. The verification terminal device 30 itself does not have the detailed private information of the user USR (medical records, candidate information, ticket information, etc.), but uses natural person information (e.g., user identification code 56) to read the information held by the interfacing system. For example, after the airline obtains the user identification code 56 and the passport number 55 using the verification terminal device 30, the airline can find the corresponding ticket information from the airline's own database according to the user identification code 56.

Taking a vehicle-mounted system as an example, a vehicle manufacturer can install a verification terminal device 30 on a vehicle, and integrate the vehicle-mounted system with the verification terminal device 30. The car manufacturer can notify the application of the verification terminal device 30 that it needs to obtain the user identification code 56 through the integrated program for the subsequent process; after receiving the token TK, the verification terminal device 30 on the car obtains the user identification code 56 according to the requirements of the vehicle-mounted system, and uses the user identification code 56 to execute the car startup function of the vehicle-mounted system. For example, the vehicle-mounted system compares the user identification code 56 with the information stored in the database of the vehicle-mounted system itself. If the user identification code 56 matches the information stored in the database of the vehicle-mounted system, the car is started.

In one embodiment, the verification terminal device 30 is installed in the power system of the car. When the user obtains the token TK with a mobile phone, the token TK is transmitted to the verification terminal device 30 through the wireless communication interface 14. After the verification terminal device 30 successfully analyzes the token TK, the verification terminal device 30 transmits the natural person information of the user (e.g., the user identification code 56) to the application of the vehicle-mounted system. At this time, car manufacturers can add new applications to the application of the vehicle-mounted system. For example, new applications can register the owner's natural person information into the vehicle-mounted system. Once it is verified that the natural person information transmitted from the verification terminal device 30 is the owner information, the car door can be opened and the car power system can be started.

The above examples of various interfacing systems are application of the identity verification function of the verification terminal device 30. The interfacing system will send the required information to the verification terminal device 30 (for example, the interfacing system requires identity card number 52, birthday 53, gender 54, etc., these required information will be informed to the verification terminal device 30), and the process to be performed after obtaining the required information (for example, obtaining user identification code 56 and then connected to the hospital system to obtain the medical record of the user USR). It completes the interface between the verification terminal device 30 and other systems.

Please refer to FIG. 10, FIG. 10 is a schematic diagram of a verification terminal device 30 analyzing a token TK in accordance with one embodiment of the present disclosure.

In one embodiment, the server 20 stores an effective time ET, a digital signature DS, user information UD, and a token TK. The server 20 generates its own public key SPK and private key SPR in advance, and the verification terminal device 30 generates its own public key CPK and private key CPR in advance.

In the following steps, steps S50 to S60 are performed by the security layer SLY of the verification terminal device 30. Steps S70 to S80 are performed by the parsing layer PLY of the verification terminal device 30. The functions of the security layer SLY and the parsing layer PLY are to verify whether the token TK is effective and valid. When the server 20 encrypts the user information UD, it adds the valid digital signature DS and the effective time ET of the token TK to the token TK together. The security layer SLY of the verification terminal device 30 performs verification on the digital signature DS in the token TK. The parsing layer PLY is to verify whether the token TK is still in the effective time ET and decrypt the user information UD in the token TK.

In one embodiment, the user USR sends the token TK to the verification terminal device 30 through the application of the mobile device 10. The verification terminal device 30 verifies the token TK to authenticate the identity of the user USR. If the verification result is correct, the verification terminal device 30 transmits the information of the user USR to the interfacing system for further operations (e.g., transmitting the information of the user USR to the hotel system 900 for confirmation of the reservation). Thereby, the verification function of the verification terminal device 30 and the application function of the interfacing system are integrated.

In step S10, once the verification terminal device 30 is connected to the network, the verification terminal device 30 and the server 20 firstly exchange each other's public keys CPK and SPK. For example, after the verification terminal device 30 is connected to the network, it transmits its public key CPK to the server 20, and the server 20 transmits its public key SPK to the verification terminal device 30.

In step S20, when the user USR uploads his biological characteristic to the server 20 through the mobile device 10 (for example, through a biometric identification application of the mobile device 10), the server 20 will compress the effective time ET, the digital signature DS, the user information UD corresponding to the biological characteristic into a token TK, thereby generating a token TK. For example, the user USR uploads his biological characteristic to the server 20 through the mobile device 10. The server 20 compares the biological characteristic with a plurality of known data stored in a database to obtain a user identification code 56 corresponding to the biological characteristic. Then, the user identification code 56 is used to find the corresponding public information status 51 in the database, and the corresponding effective time ET, digital signature DS, and user information UD are obtained according to the public information status 51 and the user identification code 56. The server 20 generates a Globally Unique Identifier (GUID) based on above information, and generates a public key PK. Therefore, the server 20 can generate the token TK according to the server information SR and the identification information AD.

In step S30, the server 20 encrypts the token TK with the public key CPK of the verification terminal device 30.

In step S40, the server 20 returns the token TK to the mobile device 10, and transmits the token TK to the verification terminal device 30 through the wireless communication interface 14 of the mobile device 10.

In step S50, after receiving the token TK, the verification terminal device 30 firstly decrypts the token TK by the private key of the verification terminal device 30.

In step S60, the verification terminal device 30 verifies whether the digital signature DS is valid by the public key SPK of the server 20. If the verification terminal device 30 verifies that the digital signature DS is valid, step S70 is performed. If the verification terminal device 30 verifies that the digital signature DS is not valid, a verification failure message is transmitted to the server 20 or the mobile device 10.

In step S70, after the verification terminal device 30 has completed decryption and verified the digital signature DS, the verification terminal device 30 then analyzes the effective time ET of the token TK. In one embodiment, if the verification terminal device 30 determines that the token TK has expired, the verification terminal device 30 sends an error message to the server 20 or the mobile device 10.

In step S80, the verification terminal device 30 parses the user information UD to obtain the required information content.

The mobile device, the verification terminal device, and the identity verification method shown in the embodiments of the present invention upload the biological characteristic to the server through the mobile device. The server generates a token corresponding to the biological characteristic. In addition, the server transmits the token to the mobile device. The mobile device transmits the token to the verification terminal device. The verification terminal device can verify the identity of the user by verifying the token, so that the process of identity verification is modularized, instead of the verification process of the application (interfacing system application) that originally needs to verify identity. By interfacing these applications with the identity verification system, there is no need for these applications to bear the cost of identity verification.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such a feature may be combined with one or more other features of the other implementations as may be desired and advantageous for any given or particular application.

What is claimed is:

1. A mobile device, comprising:
   a biological information detection device, configured to capture a biological characteristic;
   a wireless communication interface, configured to receive a token corresponding to the biological characteristic and transmit the token to a verification terminal device; and
   wherein the token comprises access information, and the access information comprises public information status;
   wherein an information category in the access information is related to the public information status;
   wherein the token generated by a server is received based on the biological characteristic;
   wherein the server compares the biological characteristic with known data stored in a database to obtain a user identification code and the public information status corresponding to the biological characteristic; the server obtains a valid time, a digital signature and user information corresponding to the user identification code according to the public information status and the user identification code, and generates a Globally Unique Identifier (GUID) according to the valid time, the digital signature and the user information, and the server generates a public key, and the server generates the token according to the user identification code, the public information status, the valid time, the digital signature, the user information, the Globally Unique Identifier (GUID) and the public key.

2. The mobile device of claim 1, wherein the wireless communication interface receives the token generated by the server according to the biological characteristic, wherein the token comprises an effective time and a digital signature.

3. The mobile device of claim 1, wherein the public information status is a fully public status, a fully regulated status, or a half regulated status;
   wherein when the public information status is the fully public status, a user basic information in the token comprises a plurality of categories of information;
   wherein when the public information status is the fully regulated status, any kind of category of information of the user basic information is not comprised in the token;
   wherein when the public information status is the half regulated status, the user basic information in the token comprises at least one category of information.

4. The mobile device of claim 1, wherein in response to the verification terminal device determining that the access information in the token has specific information requested by the verification terminal device, the specific information is transmitted to an application.

5. The mobile device of claim 4, wherein in response to the verification terminal device determining that the specific information requested by the verification terminal device does not exist in the access information in the token, the verification terminal device transmits the Globally Unique Identifier (GUID) in identification information or the identification information in the token to the server, and the verification terminal device receives the specific information from the server, and then the verification terminal device sends the specific information to an application.

6. The mobile device of claim 1, further comprising:
   a processor, configured to execute an application;
   wherein the application adjusts public information or hidden information in the access information or adjusts public information or hidden information in the identification information in the token, so as to generate an adjusted identification information or an adjusted access information, and the application generates a new token according to the adjusted identification information or the adjusted access information.

7. A verification terminal device, comprising:
   a wireless communication interface, configured to receive a token; and
   a processor, configured to disassemble access information in the token;
   wherein the access information comprises a public information status;
   wherein an information category in the access information is related to the public information status;
   wherein the token generated by a server is received based on a biological characteristic;
   wherein the server compares the biological characteristic with known data stored in a database to obtain a user identification code and the public information status corresponding to the biological characteristic; the server obtains a valid time, a digital signature and user information corresponding to the user identification code according to the public information status and the user identification code, and generates a Globally Unique Identifier (GUID) according to the valid time, the digital signature and the user information, and the server generates a public key, and the server generates the token according to the user identification code, the public information status, the valid time, the digital signature, the user information, the Globally Unique Identifier (GUID) and the public key.

8. The verification terminal device of claim 7, wherein the token comprises an effective time and a digital signature, the processor is further used to verify the digital signature, and in response to the processor determining that the token is valid according to the effective time or the digital signature, the processor determines whether the public information status is a fully public status, a fully regulated status, or a half regulated status.

9. The verification terminal device of claim 8, wherein when the public information status is the fully public status, a user basic information in the token comprises a plurality of categories of information; wherein when the public information status is the fully regulated status, any kind of category of information of the user basic information is not comprised in the token; wherein when the public information status is the half regulated status, the user basic information in the token comprises at least one category of information.

10. The verification terminal device of claim 7, wherein in response to the processor determining that the access information in the token has specific information requested by the verification terminal device, the specific information is transmitted to an application.

11. The verification terminal device of claim 7, wherein in response to the processor determining that the specific information requested by the processor does not exist in the access information in the token, the processor transmits the Globally Unique Identifier (GUID) in identification information or transmits the identification information in the token to a server, and receives the specific information from the server, and then sends the specific information to an application.

12. The verification terminal device of claim 7, wherein the wireless communication interface receives the token from a mobile device, the mobile device executes an application, the application adjusts public information or hidden information in the access information or adjusts public information or hidden information in the identification information in the token, so as to generate adjusted identification information or adjusted access information, and the application generates a new token according to the adjusted identification information or the adjusted access information.

13. An identity verification method, comprising:
capturing a biological characteristic;
transmitting the biological characteristic, and receiving a token corresponding to the biological characteristic; and
receiving the token generated by a server based on the biological characteristic;
wherein the token comprises access information, and the access information comprises a public information status;
wherein an information category in the access information is related to the public information status
wherein the server compares the biological characteristic with known data stored in a database to obtain a user identification code and the public information status corresponding to the biological characteristic; the server obtains a valid time, a digital signature and user information corresponding to the user identification code according to the public information status and the user identification code, and generates a Globally Unique Identifier (GUID) according to the valid time, the digital signature and the user information, and the server generates a public key, and the server generates the token according to the user identification code, the public information status, the valid time, the digital signature, the user information, the Globally Unique Identifier (GUID) and the public key.

14. The identity verification method of claim 13, wherein the method further comprises the following steps:
transmitting the token to a verification terminal device.

15. The identity verification method of claim 14, wherein the token comprises an effective time and a digital signature, and the identity verification method further comprises the following steps:
verifying the digital signature using the verification terminal device; in response to determining that the token is valid according to the effective time or the digital signature, the verification terminal device determines whether the public information status is a fully public status, a fully regulated status, or a half regulated status.

16. The identity verification method of claim 15, wherein the method further comprises the following steps:
wherein when the public information status is the fully public status, a user basic information in the token comprises a plurality of categories of information;
wherein when the public information status is the fully regulated status, any kind of category of information of the user basic information is not comprised in the token;
wherein when the public information status is the half regulated status, the user basic information in the token comprises at least one category of information.

17. The identity verification method of claim 15, wherein the method further comprises the following steps:
wherein in response to the verification terminal device determining that requested specific information does not exist in the access information in the token, the verification terminal device transmits the Globally Unique Identifier (GUID) in identification information or the identification information in the token to a server, and receives the requested specific information from the server, and then the verification terminal device sends the requested specific information to an application.

18. The identity verification method of claim 13, wherein the method further comprises the following steps:
executing an application;
wherein the application adjusts public information or hidden information in the access information or adjusts public information or hidden information in the identification information in the token, so as to generate adjusted identification information or adjusted access information, and the application generates a new token according to the adjusted identification information or the adjusted access information.

* * * * *